3,030,319
PROCESS FOR POLYMERIZATION OF A VINYLIDENE MONOMER IN THE PRESENCE OF A COBALTIC SALT AND AN ORGANIC REDUCING AGENT

Samuel Kaizerman, North Plainfield, and Guido Mino, Plainfield, N.J., assignors to American Cyanamid Company, New York, N.Y., a corporation of Maine
No Drawing. Filed Oct. 13, 1958, Ser. No. 766,700
20 Claims. (Cl. 260—17.4)

This invention relates to a process for polymerizing a polymerizable monomeric compound containing a polymerizable $CH_2=C<$ group in an aqueous medium at a pH not greater than about 3.5 and in the presence of certain non-ionizable organic reducing agents and a cobaltic salt which is soluble in at least one component of the reaction medium. Still further, this invention relates to an aqueous solvent polymerization process wherein a vinyl or vinylidene monomer is polymerized in the presence of certain non-ionizable organic reducing agents and in the presence of a cobaltic salt which is soluble in at least one component of the reaction medium wherein the pH of the aqueous medium is maintained at 3.5 or below. Still further, this invention relates to the process of polymerizing, in an aqueous emulsion, a polymerizable vinyl or vinylidene monomer at a pH not greater than 3.5, in the presence of a cobaltic salt which is soluble in at least one component of the reaction medium and in the presence of certain non-ionizable organic reducing agents. Among the non-ionizable organic reducing agents which may be used in the practice of the process of the present invention are alcohols, e.g., compounds containing one or more alcoholic hydroxy groups, ketones, mercaptans, aldehydes, acetals, esters, amides and nitriles.

One of the objects of the present invention is to polymerize a vinyl and/or vinylidene monomer in the presence of certain non-ionizable organic reducing agents and a cobaltic salt that is soluble in at least one component of the reaction medium wherein the polymerization reaction is carried out in an aqueous medium at a pH not greater than about 3.5. A further object of the present invention is to polymerize a vinylidene monomer in the presence of certain non-ionizable organic reducing agents which reducing agents are also capable of entering into the reaction with and initiating the polymerization of the vinylidene monomer as well as being capable of being oxidized by cobaltic salts in an aqueous medium at a pH not greater than 3.5. These and other objects of the present invention will be discussed in greater detail hereinbelow.

In the practice of the process of the present invention, the polymerization is carried out in an aqueous solution or an aqueous emulsion as contrasted with other solvent polymerization processes such as organic solvent polymerization or even bulk polymerization. Inasmuch as the process of the present invention may be carried out in an aqueous solvent medium or in an aqueous emulsion medium, it is immaterial as to whether or not the polymerizable monomeric vinylidene or vinyl compound is water soluble. If the polymerizable material is completely water soluble, one need not resort to the use of an emulsion system. On the other hand, if the polymerizable monomer is only partly soluble in water, one may find that the polymerization can be carried out in an aqueous solvent medium without benefit of an emulsifying agent by means of a dispersing agent or by use of a dispersing technique such as rapid agitation wherein the monomeric material, the reducing agent and the cobaltic salt have ample opportunity to come into reactive contact with one another to produce the desired polymerizable product. For monomeric materials that are only slightly soluble in water or are substantially completely insoluble in water, the emulsion polymerization technique is recommended.

In carrying out the process, it is imperative to use at least one of a class of certain non-ionizable organic reducing agents as described briefly hereinabove and discussed more fully hereinbelow and a cobaltic salt which is soluble in at least one component of the reaction medium, namely in the vinylidene monomer and/or the reducing agent and/or water.

Among the monomeric polymerizable compounds which may be used in the practice of the process of the present invention are those containing a polymerizable $CH_2=C<$ group. This includes vinylidene compounds and/or vinyl compounds. More specifically, the following polymerizable monomers may be used: styrene, and substituted styrenes such as ring-substituted and side chain substituted styrenes, e.g., α-chlorostyrene, α-methylstyrene, and the like, o-methylstyrene, m-methylstyrene, p-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, or polymerizable acrylic compounds such as acrylic amides and nitriles and the like, and the acrylic type acid esters of monohydric alcohols such as the methyl, ethyl, propyl, butyl, isobutyl, amyl, hexyl, cyclohexyl, heptyl, octyl, decyl alcohols or the acrylic type acid esters of nitro alcohols such as 3-nitro-2-butanol, 2-nitro-3-hexanol, 2-methyl-2-nitro-1-butanol and 2-nitro-2-methylpropyl alcohol, and the acrylic type acid esters of polyhydric alcohols such as ethylene glycol, diethylene glycol, glycerol, pentaerythritol, dipentaerythritol, propylene glycol, dipropylene glycol and the like. Additionally, one may make use of such polymerizable monomers such as butadiene, isoprene and haloprenes such as chloroprene. Still further, as the polymerizable monomer, one may use allyl compounds such as allyl alcohol or allyl or substituted allyl esters such as methallyl esters. More specifically, one may use allyl acetate, allyl propionate, allyl chloroacetate, allyl caproate, allyl linoleate, allyl benzoate, methallyl acetate, the allyl ester of isobutyric acid, allyl acrylate, diallyl carbonate, diallyl oxalate, diallyl phthalate, diallyl maleate, triallyl cyanurate and the like. Still further, one may make use of the vinyl or vinylidene esters such as vinyl acetate, vinyl chloride, vinylidene chloride, vinyl propionate, vinyl butyrate, and the like. Vinyl ethers may also be used such as vinylethylether, vinylpropylether, vinylisobutylether and the like or other vinyl compounds such as divinylsulfone, divinylsulfide, vinyl pyridine and the like. Additionally, one may make us of the unsaturated polymerizable amides such as acrylamide, methacrylamide, ethacrylamide, methylenebisacrylamide and the like, or the nitriles such as acrylonitrile, methacrylonitrile, ethacrylonitrile, alpha-chloroacrylonitrile and the like. Whenever desirable, these polymerizable monomers may be used either singly or in combination with one another.

In the practice of the process of the present invention, it is imperative that a non-ionizable organic reducing agent be used which is capable of being oxidized by the cobaltic salt present in the system and which is capable of initiating the polymerization of the vinylidene compound. These reducing agents may be selected from the group consisting of alcohols, i.e., compounds containing one or more alcoholic hydroxy groups, ketones, mercaptans, aldehydes, acetals, esters, amides and nitriles. These reducing agents may be either monomeric or polymeric depending upon availability.

Among the alcohols which may be used in the practice of the process of the present invention are the monohydric and polyhydric alcohols. Primary, secondary and/or tertiary alcohols may be used. More specifically, one may make use of methanol, ethanol, propanol, butanol, octadecanol, phenylethyl alcohol, phenylpropyl alcohol, chloro-phenylethyl alcohol, isopropanol, 1,3-dichloropropanol-2, 1-phenylpropanol-2, 1-(chlorophenyl)-propanol-2, or the glycols, such as ethylene glycol, diethylene glycol, propylene glycol, dipropylene glycol, trimethylene glycol and other polyhydric alcohols such as glycerol, mannitol, carbitol, pinacol, sorbitol and the alkandiols, such as 1,4-butandiol, 1,3-butandiol, 1,5-pentandiol, 2,3-pentandiol, 1,3-pentandiol, and alkoxy alcohols such as ethoxy ethanol, ethoxy propanol, butoxy propanol, or aroxy alcohols such as phenoxy ethanol and the like. Mono and diglycerides may additionally be used such as the glycerol monopropionate and the like.

If polymeric alcohols are to be used in the present invention, one may make use of such polymeric alcohols as polyvinyl alcohol, partial esters of polyvinyl alcohol, as for example, formylated polyvinyl alcohol, acetylated polyvinyl alcohol, sulfated polyvinyl alcohol, nitrated polyvinyl alcohol, and the like; partial ethers of polyvinyl alcohol as cyanoethylated polyvinyl alcohol, cellulose, including cotton, viscose, cuprammonium rayon, partial esters of cellulose such as cellulose acetate, cellulose propionate, cellulose nitrate and the like; partial ethers of cellulose such as methyl cellulose, ethyl cellulose, hydroxy ethyl cellulose, cyanoethylated cellulose and the like; starch, partial ethers of starch, as for example, cyanoethylated starch; partial esters of starch, as for example, acetylated starch; poly β-hydroxy ethyl methacrylate and copolymers thereof, and poly β-hydroxy ethyl acrylate and copolymers thereof and the like.

One may use monomeric ketones in the practice of the process of the present invention such as acetone, methylethyl ketone, diethyl ketone, methylpropyl ketone, ethylpropyl ketone, dipropyl ketone, or derivatives thereof such as methylacetoacetate, ethylacetoacetate, propylacetoacetate, 1-phenyl butanone-3 and the like. Among the polymeric ketones which may be used in the present invention are polyvinyl pyrrolidone, polymethylvinyl ketones, polyethylvinyl ketones, polypropylvinyl ketones and copolymers prepared by polymerizing alkyl vinyl ketones with other polymerizable materials such as those vinylidene and/or vinyl monomers recited hereinabove.

Among the mercaptans which may be used as reducing agents in the present invention are methyl mercaptan, ethyl mercaptan, n-propyl mercaptan, isopropyl mercaptan, 2-mercaptobutane, n-butyl mercaptan, n-decyl mercaptan, lauryl mercaptan, phenylethyl mercaptan and the like. Furthermore, tertiary butyl, tertiary amyl, tertiary octyl mercaptan or the like may be employed. Additionally, one may use as polymeric mercaptans such materials as polymercaptoethylacrylate, polymercaptobutylacrylate, polymercaptoethyl methacrylate, polymercaptopropyl acrylate, polymercaptopropyl methacrylate, and the like or copolymers of mercaptoethyl acrylate, mercaptobutyl acrylate, mercaptoethyl methacrylate, mercaptopropyl acrylate, mercaptopropyl methacrylate and the like with other polymerizable materials containing a polymerizable $CH_2=C<$ group as recited hereinabove.

Among the monomeric aldehydes which may be used in the present invention are formaldehyde, acetaldehyde, propionaldehyde, butyraldehyde, phenyl propionaldehyde, heptaldehyde, and materials engendering monomeric aldehydes such as trioxymethylene, paraformaldehyde, and the like. Examples of polymeric aldehydes which may be used in the present invention are polyacrolein, poly 3-butenal, poly 3-pentenal, poly 5-chloro-3-pentenal and the like or copolymers prepared by polymerizing acrolein, 3-butenal, 3-pentenal, 5-chloro-3-pentenal and the like with other polymerizable materials containing the $CH_2=C<$ group such as those recited hereinabove.

The acetals which may be used as reducing agents in the present invention are such as dimethyl acetal, diethyl acetal, dipropyl acetal, formal, diethyl formal, dipropyl formal, dimethyl butyral, diethyl butyral and the like. Additionally, one may make use of the hemiacetals as the monomeric reducing agent such as methyl formaldehyde hemiacetal, ethyl formaldehyde hemiacetal, methyl acetaldehyde hemiacetal, propyl acetaldehyde hemiacetal, methyl butyraldehyde hemiacetal, propyl butyraldehyde hemiacetal and the like. In addition, one may use such polymeric acetals as polyvinyl formal, polyvinyl acetal, polyvinyl butyral and the like.

One may make use of various esters as reducing agents such as methyl malonate, methyl isosuccinate, propyl malonate, ethyl malonate and the like. Furthermore, nitriles may be used such as malononitrile, isosuccinonitrile, ethylmalononitrile, propylmalononitrile, isobutylmalononitrile, and the like.

Among the amides which may be used as reducing agents in the present invention are cyanoacetamide, α-cyanopropionamide, malonamide, ethyl malonamide, propyl malonamide, chloro-malonamide, isosuccinamide, and the like.

It should be noted that all of the reducing agents set forth hereinabove are non-ionizable in water but are capable of being oxidized by cobaltic salts and are additionally capable of initiating the polymerization of the vinyl and/or vinylidene compounds and of entering into reaction with said polymerizable compounds when the polymerization is carried out in the presence of the cobaltic salt. Certain of the polymerizable monomers as described hereinabove are capable of functioning as a reducing agent as well as a monomer in the polymerization reaction. Examples of such compounds are allyl alcohol, methallyl alcohol, acrolein, beta-methacrolein, beta-hydroxy ethyl acrylate, beta-hydroxy ethyl methacrylate, methyl vinyl ketone, ethyl vinyl ketone, propyl vinyl ketone, and the like. When the reducing agent is also a polmerizable material, it should be different from the other polymerizable material containing the $CH_2=C<$ group. Otherwise, simple homopolymerization will take place which is not within the purview of this invention.

The reaction-process of the present invention may be carried out at temperatures between about −10° C. and 100° C. but preferably at temperatures between −10° C. and +10° C. The process may be carried out under sub-atmospheric pressure or super-atmospheric pressure but preferably at atmospheric pressure. Although any pH value below about 3.5 may be used, it is preferred that the pH value be between 1 and 2.

The amount of cobaltic compound which is used in the practice of the process of the present invention may be varied over fairly wide limits. For example, one may utilize from about $10^{-6}$ to $10^{-1}$ mol of cobaltic ion per mol of polymerizable monomer. One would use between about $10^{-3}$ to $10^{-2}$ mol of cobaltic ion per mol of polymerizable monomer. The cobaltic ion is preferably introduced into the reaction mixture in the form of a cobaltic salt. Among the salts adapted for use in the present invention are cobaltic nitrate, cobaltic sulfate, cobaltic perchlorate, cobaltic ammonium nitrate, cobaltic ammonium sulfate, cobaltic pyrophosphate, and cobaltic ammonium pyrophosphate. These cobaltic salts may be used either singly or in combination with one another. Cobaltic compounds which are capable of forming cobaltic salts in situ under the acid conditions of the polymerization reaction such as cobaltic hydroxide and the like may be used.

In general, the time required to achieve a desired degree of polymerization may be determined empirically. Thus for example, a given polymer may be precipitated at different time intervals and the extent of polymerization determined gravimetrically in order to determine the percent of conversion of monomer to polymer. Where the amount of cobaltic ion and monomer is known, suitable reaction times may be readily established to achieve the desired degree of polymerization. In addition, the cobaltic ion, when being reduced, undergoes a color change from blue to pink, at which time it is substantially completely reduced and will no longer effectively initiate polymerization. Thus, in an aqueous system, an operator is readily able to determine when the reaction has gone to substantial completion.

Should it be desirable to halt the reaction at any given time while the cobaltic ion is still present in the reaction mixture, this may be accomplished by the addition of hydroquinone, sodium sulfite or ferrous sulfate which materials will exhaust the remaining cobaltic ion substantially instantaneously, thus halting the reaction. As an additional method of halting the reaction, the pH of the reaction mixture may be adjusted to the alkaline side, as for example, to a pH of between 7 and 8 in order to precipitate out the remaining portion of the cobaltic salt, prohibiting its further reduction and thus stopping the reaction.

The amount of reducing agent to monomeric material may be varied extensively depending on the properties of the ultimate product desired. As a consequence, large excesses of either material may be utilized in alternate reactions. The monomeric reducing agent may be employed in amounts from about 0.01% to about 300% by weight based on the weight of the monomer and preferably from about 0.1% and 100% by weight based on the weight of the monomer.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer and insert gas inlet and outlet tubes, there is introduced 5 parts of monomeric acrylamide and 1 part of ethylene glycol dissolved in 65 parts of water. The system is flushed with nitrogen to purge it of oxygen and the system is cooled to 0° C. 30 parts of 10 N sulfuric acid are added followed by 5 parts of 0.1 molar solution of cobaltic sulfate in 2.5 molar sulfuric acid. The polymerization is allowed to proceed for 30 minutes at 0°C. after which the solution is poured into an excess of acetone to precipitate the polymer. The polymeric material is collected by filtration and dried under vacuum to a constant weight. The yield of polymer was 4.8 parts and represented a conversion of 96%.

*Example 2*

Into a suitable reaction vessel equipped as in Example 1, there is introduced 6 parts of inhibitor-free acrylonitrile and 1 part of propionaldehyde dissolved in 95 parts of water. The system is purged of oxygen by flushing with carbon dioxide and the solution cooled to 0° C. 10 parts of 10 N sulfuric acid are added followed by 5 parts of 0.1 molar solution of cobaltic sulfate in 5 molar sulfuric acid. The polymerization is allowed to proceed for about 1 hour at 0° C. The polymer was separated by filtration and dried in vacuo. The yield of polymer was 4.9 parts and represented a conversion of 82%.

*Example 3*

Into a suitable reaction vessel equipped as before, there is introduced 3 parts of polyvinyl alcohol and 5 parts of methyl acrylate dissolved in 85 parts of 2.5 N sulfuric acid. The solution is cooled to 0° C. and the system purged with carbon dioxide. 6 parts of 0.1 molar solution of cobaltic sulfate in 5 N sulfuric acid are then added. After 1½ hours, the resulting latex was coagulated by pouring into an excess of methanol. The polymer was sepadated by filtration and dried in vacuo. The yield of 6.5 parts represented a conversion of 70%. The grafting efficiency was 93%.

*Example 4*

A solution of 10 parts of acrylonitrile and 190 parts of water is introduced into a suitable reaction vessel equipped as before and the system is flushed with carbon dioxide and cooled to 3° C. 10 parts of a 0.1 molar solution of cobaltic sulfate in 2.5 molar sulfuric acid are then added. A sample of cotton percale weighing 4.7 parts is then immersed in the solution and agitated frequently over a 15-minute period. The fabric, after drying, weighed 5.9 parts. The weight increase due to the grafting of polyacrylonitrile on the cellulose was 12.5%.

*Example 5*

Into a suitable reaction vessel equipped as before, there is introduced 6 parts of acrylonitrile dissolved in a mixture of 50 parts of 6 N sulfuric acid and 45 parts of water. The system is flushed with carbon dioxide to remove the oxygen and the solution is cooled to 0° C. 1 part of propane dithiol and 5 parts of a 0.09 molar solution of cobaltic sulfate in 5 N sulfuric acid are added and the polymerization is allowed to proceed for a period of 1 hour. The polymer is separated from the slurry by filtration and is then washed and dried. The yield was about 3.3 parts which represents a conversion of 55%.

*Example 6*

Into a suitable reaction vessel equipped as before, there is introduced a mixture of 50 parts of 6 N sulfuric acid and 45 parts of water. The system is flushed with nitrogen to remove the oxygen. The solution is then cooled to 0° C. and 6 parts of acrylonitrile are added followed by 1 part of ethyl malonate and 5 parts of a 0.09 molar solution of cobaltic sulfate in 5 N sulfuric acid. The polymerization is allowed to proceed for 4½ hours after which the polymer is separated from the mixture by filtration. The yield of polymer was 4.7 parts and represented a conversion of 79%.

*Example 7*

The procedure of Example 6 was repeated in all details except that in the place of the 1 part of ethyl malonate, there is substituted 1 part of methyl ethyl ketone. The yield of polymer was 5.8 parts representing a conversion of 97%.

The polymeric materials produced by the practice of the process of the present invention will have utility in those fields in which vinyl polymers are used such as in molding, adhesives, laminating, or they may be used in the textile and paper fields, particularly where more durable finishes for fabrics and fibers are desired such as when fabrics are needed that are more resistant to fire, shrinkage, rot, acids, mildew and the like.

We claim:

1. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium, and a non-ionizable organic reducing agent which is capable of being oxidized by said cobaltic salt and which is capable of initiating the polymerization, said reducing agent being selected from the group consisting of alcohols, ketones, mercaptans, aldehydes, acetals, carboxylic acid esters, amides and nitriles.

2. A process comprising polymerizing a polymerizazble monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising a compound containing at least one alcoholic hydroxy group.

3. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising a polymeric alcohol.

4. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising a cellulosic material.

5. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising cellulose.

6. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising cotton.

7. A process comprising polymerizing a polymerizable monomeric compound containing a polymerizable $CH_2=C<$ group in an aqueous medium at a pH not greater than about 3.5 in the presence of a catalyst consisting essentially of a cobaltic salt of an inorganic acid which is soluble in at least one component of the reaction medium and a non-ionizable organic reducing agent comprising polyvinyl alcohol.

8. A process comprising polymerizing acrylamide in an aqueous medium at a pH not greater than about 3.5 in the presence of a catalyst consisting essentially of a cobaltic salt of an inorganic acid which is soluble in at least one component of the reaction medium, and a non-ionizable organic reducing agent which is capable of being oxidized by said cobaltic salt and which is capable of initiating the polymerization, said reducing agent being selected from the group consisting of alcohols, ketones, mercaptans, aldehydes, acetals, carboxylic acid esters, amides and nitriles.

9. A process comprising polymerizing acrylonitrile in an aqueous medium at a pH not greater than about 3.5 in the presence of a catalyst consisting essentially of a cobaltic salt of an inorganic acid which is soluble in at least one component of the reaction medium, and a non-ionizable organic reducing agent which is capable of being oxidized by said cobaltic salt and which is capable of initiating the polymerization, said reducing agent being selected from the group consisting of alcohols, ketones, mercaptans, aldehydes, acetals, carboxylic acid esters, amides and nitriles.

10. A process comprising polymerizing methylacrylate in an aqueous medium at a pH not greater than about 3.5 in the presence of a catalyst consisting essentially of a cobaltic salt of an inorganic acid which is soluble in at least one component of the reaction medium, and a non-ionizable organic reducing agent which is capable of being oxidized by said cobaltic salt and which is capable of initiating the polymerization, said reducing agent being selected from the group consisting of alcohols, ketones, mercaptans, aldehydes, acetals, carboxylic acid esters, amides and nitriles.

11. A process comprising polymerizing acrylamide in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising a compound containing at least one alcoholic hydroxy group.

12. A process comprising polymerizing acrylamide in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising a polymeric alcohol.

13. A process comprising polymerizing acrylamide in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising a cellulosic material.

14. A process comprising polymerizing acrylamide in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising cotton.

15. A process comprising polymerizing acrylonitrile in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising a polymeric alcohol.

16. A process comprising polymerizing acrylonitrile in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising cellulose.

17. A process comprising polymerizing acrylonitrile in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising cotton.

18. A process comprising polymerizing methylacrylate in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising a cellulosic material.

19. A process comprising polymerizing methylacrylate in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising cellulose.

20. A process comprising polymerizing methylacrylate in an aqueous medium at a pH not greater than about 3.5 in the presence of a catalyst consisting essentially of a cobaltic salt of an inorganic acid which is soluble in at least one component of the reaction medium, and a non-ionizable organic reducing agent comprising cotton.

References Cited in the file of this patent

UNITED STATES PATENTS

| | | |
|---|---|---|
| 2,684,357 | Troyan et al. | July 20, 1954 |
| 2,922,768 | Mino et al. | Jan. 26, 1960 |